United States Patent
Huguenin et al.

(10) Patent No.: US 6,180,073 B1
(45) Date of Patent: Jan. 30, 2001

(54) COMPOUND WITH BASE OF AN ALKALINE-EARTH, SULPHUR AND ALUMINIUM, GALLIUM OR INDIUM, METHOD OF PREPARING SAME AND USE AS LUMINOPHORE

(75) Inventors: Denis Huguenin; Pierre Macaudiere, both of Asnieres-sur-Seine (FR)

(73) Assignee: Rhodia Chimie, 92408 Courbevoie (FR)

( * ) Notice: Under 35 U.S.C. 154(b), the term of this patent shall be extended for 0 days.

(21) Appl. No.: 09/297,490

(22) PCT Filed: Oct. 28, 1997

(86) PCT No.: PCT/FR97/01935

§ 371 Date: Jul. 23, 1999

§ 102(e) Date: Jul. 23, 1999

(87) PCT Pub. No.: WO98/18721

PCT Pub. Date: May 7, 1998

(30) Foreign Application Priority Data

Oct. 31, 1996 (FR) .................................................. 96 13352

(51) Int. Cl.$^7$ ............................ C01F 1/00; C04B 34/547; C04B 35/622; C09K 11/08
(52) U.S. Cl. ................... 423/155; 423/518; 252/301.4 S; 252/519.4
(58) Field of Search .................. 252/301.4 S, 519.4; 423/518, 155, 179; 428/403; 315/169.3; 250/472.1

(56) References Cited

U.S. PATENT DOCUMENTS 4,801,398 * 1/1989 Ohno et al. .................. 252/301.4 R 5,985,173 * 11/1999 Gray et al. .................. 252/301.4 R

FOREIGN PATENT DOCUMENTS

2154533 * 11/1973 (FR) .
07242869 * 9/1995 (JP) .

OTHER PUBLICATIONS

Peters et al "Luminescence and Structural Properties of Thiogallate Phophours . . . " J. Electrochem. Soc. Solid–State Science & Tech. Feb. 1972 pp. 230–236.*

* cited by examiner

Primary Examiner—Mark Kopec
(74) Attorney, Agent, or Firm—Jean-Louis Seugnet

(57) ABSTRACT

The present invention relates to a compound based on an alkaline-earth metal, on sulphur and on aluminium, on gallium or indium, to its process of preparation and to its use as luminophore. The compound of the invention corresponds to the formula $AB_2S_4$, in which A represents an alkaline-earth metal and B aluminum, gallium, or indium and it is characterized in that it is provided in the form of a powder with a residual oxygen content of not more that 1.5% and composed of particles with a mean size of not more than 10 $\mu$m. This compound is obtained by a process which contains the following stages: a solution or a suspension comprising salts of the elements A and B is formed, the solution or the suspension is dried by atomization and the product obtained in the preceding stages is reacted with carbon disulphide or with a mixture of hydrogen sulphide and or carbon disulphide. The compound of the invention can be used as a luminophore, in particular in cathodoluminescence.

6 Claims, 1 Drawing Sheet

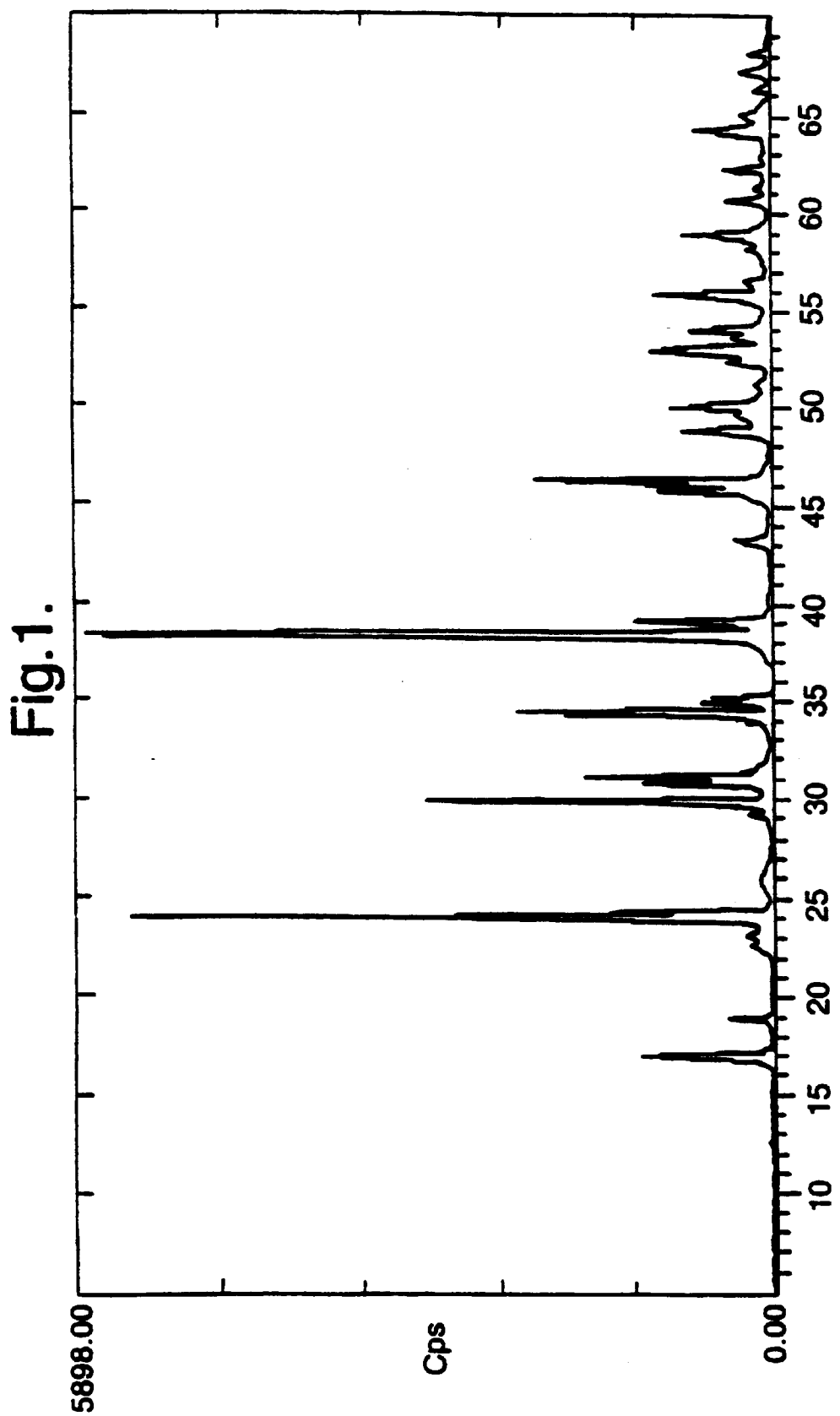

COMPOUND WITH BASE OF AN ALKALINE-EARTH, SULPHUR AND ALUMINIUM, GALLIUM OR INDIUM, METHOD OF PREPARING SAME AND USE AS LUMINOPHORE

This application is an application under 35 U.S.C. Section 371 of International Application Number PCT/FR97/01935, filed on Oct. 28, 1997.

The present invention relates to a compound based on an alkaline-earth metal, on sulphur and on aluminium, or gallium or on indium, to a process for its preparation and to its use as luminophore.

The fields of luminescence and of electronics are currently experiencing significant developments. Mention may be made, as an example of these developments, of the development of cathodoluminescent systems for novel display and illumination techniques. One concrete application is that of the replacement of existing television screens by flat screens. These novel applications require luminophore materials exhibiting increasingly improved properties. Thus, in addition to their property of luminescence, these materials are required to have specific characteristics of morphology or of particle size, in order to facilitate in particular their employment in the desired applications.

More specifically, luminophores are requited which are micronic in size and which optionally have a narrow particle size distribution.

Alkaline-earth metal thiogallates are known as luminophores. These products are prepared from a mixture of salts or of oxides of the various constituents by heating at high temperature in the presence of a flux. This method of preparation results in products which are large in size and which have an often very broad particle size distribution.

The object of the invention is to provide products of this type with a small particle size.

With this aim, the compound of the invention, a first embodiment, corresponds to the formula $AB_2S_4$ (1), in which A represents one or more alkaline-earth metals and B at least one element taken from the group comprising aluminium, gallium or indium, and it is characterized in that it is provided in the form of a powder with a residual oxygen content of not more than 1.5%, more particularly of not more than 1%.

According to a second embodiment, the compound of the invention corresponds to the formula (1) and it is characterized in that it is provided in the form of a powder composed of whole or unmilled particles with a mean size of not more than 10 µm.

The invention also relates to a process for the preparation of such a compound, which is characterized in that it contains the following stages:

a solution or a suspension comprising salts of the elements A and B and optionally of the doping element is formed;

the solution or the suspension is dried by atomization;

the product obtained in the preceding stage is reacted with carbon disulphide or with a mixture of hydrogen sulphide and of carbon disulphide.

Finally, the invention relates to the use as luminophore, in particular in cathodoluminescence, of a compound as described above.

Other characteristics, details and advantages of the invention will become still more fully apparent on reading the description which follows and the appended drawing, in which:

FIG. 1 is an X-ray spectrum of a compound according to the invention.

As explained above, the compound of the invention is provided in the form of a powder and it corresponds to the formula (1) $AS_2S_4$. In this formula, A is an alkaline-earth metal (group IIa of the Periodic Classification). The Periodic Classification of the elements to which reference is made is, here and throughout the description, that published in the Supplement to the Bulletin de la Société Chimique de France, No. 1 (January, 1966)

A can very particularly be strontium. A can also be magnesium, calcium or barium.

B can be aluminium, gallium or indium. B can more particularly be gallium. According to a specific embodiment, the compound of the invention is preferably a strontium thiogallate.

The invention also relates to the compounds in which A represents several alkaline-earth metals. Likewise, B can represent a combination of at least two of the elements aluminium, gallium or indium.

The compound of the invention can comprise one or more doping elements. Doping element is understood to mean, in this instance, any element which can confer, on the compound of formula (1), properties of luminescence in a given application of the compound as luminophore. Without wishing to be restricted by a theory, it may be thought that the doping element can substitute for the alkaline-earth metal. The Count of doping element is usually not more than 10 atom % with respect to the alkaline-earth metal element. More particularly, this doping element can be chosen from divalent manganese, divalent rare-earth metals and the group comprising trivalent rare-earth metals in combination with an alkali metal. In the case of trivalent rare-earth metals, the presence of an alkali metal is necessary to compensate for the excess charge of the rare-earth metal. The alkali metal can more particularly be sodium.

Rare-earth metal is understood to mean the elements from the group composed of yttrium and the elements of the Periodic Classification with an atomic number of between 57 and 71 inclusive.

The doping element can more particularly be europium (II), ytterbium(II) or cerium(III) in combination with an alkali metal.

According to a first embodiment the compound of the invention is characterized by its low residual oxygen content. This content is in fact lower than that of the compounds of the prior art, This low residual oxygen level could be one of the reasons—for the advantageous luminescence properties of the product of the invention. As indicated above, this residual content is not more than 1.5%, more particularly not more than 1%. It is expressed as weight of oxygen with respect to the total weight of the compound.

According to a second embodiment of the invention, the compound of the invention is characterized by its morphology. According to this embodiment, the compound is composed of particles with a mean size of not more than 10 µm. Throughout the description, the characteristics of site and of particle size distribution are measured by the laser diffraction technique, using a particle sizer of the Cilas HR 850 type (distribution by volume).

This mean size can more particularly be not more than 5 µm and more particularly still not more than 4 µm.

The particles for which the size has been given above are unmilled or whole particles. Scanning electron microscopy photos make it possible to show that these particles do not have the broken or shattered appearance which is exhibited by particles which have been subjected to milling. Likewise, these photos show that these particles do not exhibit, adhering to their surface, particles of a markedly finer size, as can be the case as the result of milling, where fine particles created by the milling can become aggregated into bigger particles. However, it should be noted that the powder constituting the product of the invention may have been simply deagglomerated.

The compounds according to the first embodiment can, of course, exhibit the particle size characteristics which have just been given above, in combination with the characteristic of residual oxygen content. Likewise, those of the second embodiment can also exhibit, in combination with the particle size characteristics, the oxygen content of the compounds of the first embodiment.

All the additional characteristics which will now be given apply to both embodiments.

According to a preferred alternative form of the invention, the compound exhibits a narrow particle size distribution. Thus, the dispersion index σ/m is not more than 0.7. It can more particularly be not more than 0.6.

Dispersion index is understood to mean the ratio:

$$\sigma/m = (d_{84} - d_{16})/2d_{50}$$

in which:

$d_{84}$ is the diameter of the particles for which 84% of the particles have a diameter below $d_{84}$;

$d_{16}$ is the diameter of the particles for which 16% of the particles have a diameter below $d_{16}$;

$d_{50}$ is the mean diameter of the particles.

The compounds of the invention can be composed of particles with a substantially spherical shape for which the diameter corresponds to the mean sizes which have been given above.

Another characteristic of the compounds of the invention is that they are provided in the form of a pure crystallographic phase, it being possible for this purity to be demonstrated by the X-ray diffraction spectra of the compounds.

In the specific case of strontium thiogallate, this crystallographic phase is a cubic phase.

The process for the preparation of the compounds of the invention will now be described.

The first stage of the process consists in forming a solution or a suspension comprising salts of the elements A and B and optionally of the doping element.

Use is generally made of inorganic salts, such as nitrates, sulphates or chlorides or alternatively hydroxides. Use may optionally be made of organic salts but it is preferable, in this case, to employ salts exhibiting few carbon atoms, such as carbonates or acetates.

The salts are placed in a liquid medium, preferably water, in order to form a solution or a suspension.

The following stage consists in drying the prepared solution or suspension. This drying is carried out by atomization.

Drying by atomization is understood to mean drying by spraying the mixture into a hot atmosphere (spray drying). The atomization can be carried out by means of any sprayer known per se, for example a spray nozzle of the shower head or other type. It is also possible to use so-called rotary atomizers. Reference may especially be made, on the various spraying techniques capable of being used in the present process, to the standard work by Masters entitled "Spray Drying" (second edition, 1976, published by George Godwin—London).

It should be noted that it is also possible to implement the atomization/drying operation by means of a "flash" reactor, for example of the type developed by the Applicant Company and described especially in French Patent Applications Nos. 2,257,326, 2,419,754 and 2,431,321. In this case, the treating gases (hot gases) are driven with a helical movement and flow in a vortex sink. The mixture to be dried is injected along a trajectory which joins with the axis of symmetry of the helical trajectories of the said gases, which makes it possible to completely transfer the amount of movement of the gases to the mixture to be treated. The gases thus in fact provide a two-fold function: on the one hand, the spraying, that is to say the conversion of the initial mixture into fine droplets, and, on the other hand, the drying of the droplets obtained. Moreover, the extremely low residence time (generally less than approximately 1/10 second) of the particles in the reactor has the advantage, inter alia, of limiting possible risks of overheating as a result of an excessively long contact with the hot gases.

As regards the flash reactor mentioned above, reference may in particular be made to FIG. 1 of French Patent Application 2,431,321.

This flash reactor is composed of a combustion chamber and of a contact chamber composed of a cone union body or of a truncated cone, the upper part of which diverges. The combustion chamber emerges into the contact chamber via a reduced passage.

The upper part of the combustion chamber is equipped with an opening which allows the combustible phase to be introduced.

Moreover, the combustion chamber comprises an internal coaxial cylinder, thus defining, within the combustion chamber, an annular central region and an annular peripheral region, exhibiting perforations mainly lying towards the upper part of the device. The chamber comprises at least six perforations distributed over at least one circle but preferably over several circles which are spaced out axially. The total surface area of the perforations located in the lower part of the chamber can be very low, of the order of 1/10 to 1/100 of the total surface area of the perforations of the said internal coaxial cylinder.

The perforations are usually circular and are very thin. Preferably, the ratio of the diameter of the latter to the thickness of the wall is not less than 5, the minimum thickness of the wall being limited solely by mechanical constraints.

Finally, an angled pipe emerges into the reduced passage, the end of which opens into the axis of the central region.

The gaseous phase driven with a helical movement (subsequently known as helical phase) is composed of a gas, generally air, introduced into an orifice made in the annular region; this orifice is preferably situated in the lower part of the said region.

In order to obtain a helical phase in the reduced passage, the gaseous phase is preferably introduced at low pressure into the abovementioned orifice, that is to say at a pressure below 1 bar and more particularly at a pressure of between 0.2 and 0.5 bar above the pressure existing in the contact chamber. The speed of this helical phase is generally between 10 and 100 m/s and preferably between 30 and 60 m/s.

Moreover, a combustible phase, which can in particular be methane, is injected axially via the abovementioned opening into the central region at a speed of approximately 100 to 150 m/s The combustible phase is ignited by any known means in the region where the fuel and the helical phase are in contact.

The forced passage of the gases in the reduced passage subsequently takes place according to an array of trajectories coincident with families of generators of a hyperboloid. These generators are based on a family of circles, of rings which are small in size, located close to and below the reduced passage, before diverging in all directions.

The mixture to be treated is then introduced in the liquid form via the abovementioned pipe. The liquid is then fractionated into a multitude of drops, each of them being transported by a volume of gas and subjected to a movement which creates a centrifugal effect. The flow rate of the liquid is usually between 0.03 and 10 m/s.

The ratio of the amount of movement specific to the helical phase to that of the liquid mixture must be high. In particular, it is not less than 100 and preferably between 1000 and 10,000. The amounts of movement within the reduced passage are calculated as a function of the inlet flow rates of the gas and of the mixture to be treated, and of the cross-section of the said passage. An increase in the flow rates results in an enlargement in the size of the drops.

Under these conditions, the movement specific to the gases is imposed in its direction and its intensity on the drops of the mixture to be treated, which have been separated from one another in the region of convergence of the two streams. Moreover, the speed of the liquid mixture is reduced to the minimum necessary for obtaining a continuous flow.

The atomization generally takes place with an outlet temperature of the solid of between 90 and 150° C.

The final stage of the process consists in sulphurizing the product obtained on conclusion of the drying.

This sulphurization is carried out by reacting the product obtained in the preceding stage with carbon disulphide, hydrogen sulphide or with a mixture of hydrogen sulphide and of carbon disulphide. The sulphurization reaction is carried out at a temperature of between 600° C. and 1000° C., preferably at approximately 800° C.

In the case of a mixture of hydrogen sulphide and of carbon disulphide, the respective proportions of $CS_2$ and of $H_2S$ can vary within wide proportions. The flow rate of the sulphurizing gas ($CS_2$, $H_2S$ or $CS_2$ and $H_2S$) is usually chosen so that the amount of $CS_2$ or $H_2S$ injected into the system during the reaction, that is to say between the beginning of the temperature rise (beginning of the heat cycle) and the end of the high-temperature stationary phase, is sufficient to convert all the precursor into sulphide. A molar ratio ([sulphurizing gas]/[A]+[B]) of greater than 4 generally makes it possible to meet this requirement.

The sulphurizing gas can be employed with an inert gas, such as argon or nitrogen.

The duration of the reaction corresponds to the time necessary for the desired sulphide to be obtained.

On conclusion of the heating, the sulphide formed is recovered.

Additional alternative forms of the compound according to the invention will now be described. In the case of these alternative forms, all the characteristics of the compound which have already been described also apply.

According to a first of these alternative forms, the compound is provided in the form of a powder, the particles of which comprise a layer based on at least one transparent oxide.

This layer coats the particles; it may not be perfectly continuous or homogeneous. However, preferably, the particles constituting the compound according to this alternative form comprise a coating layer of transparent oxide which is uniform and of controlled thickness.

Transparent oxide is understood to mean, in this instance, an oxide which, once deposited on the particle in the form of a more or less fine film, only absorbs light rays in the visible region to a very small extent or not at all. In addition, it should be noted that the term oxide, which is used for convenience throughout the present description relating to this alternative form, should be understood as also covering oxides of the hydrated type.

These oxides, or hydrated oxides, can be amorphous and/or crystalline.

Mention may more particularly be made, as examples of such oxides, of silicon oxide (silica), aluminium oxide (alumina), zirconium oxide (zirconia), titanium oxide, zirconium silicate $ZrSiO_4$ (zircon) and rare-earth metal oxides. According to a preferred alternative form, the coating layer is based on silica. More advantageously still, this layer is essentially, and preferably solely, composed of silica.

The process for the preparation of a transparent-oxide compound according to this alternative form consists essentially in bringing the starting compound into contact with a precursor of the abovementioned transparent oxide and in precipitating the transparent oxide. Starting compound is understood to mean the compound as obtained following the preparation and sulphurization process described above and after optional deagglomeration.

Examples of processes will be given below for the various types of transparent oxides.

In the case of silica, mention may be made of the preparation of silica by hydrolysis of an alkyl silicate, by forming a reaction mixture by mixing water, alcohol, the compound, which is then suspended, and optionally a base, an alkali metal fluoride or an ammonium fluoride which can act as catalyst of the condensation of the silicate. The alkyl silicate in then introduced. A preparation can also be carried out by reaction of the compound, of a silicate, of the alkali metal silicate type, and of an acid.

In the case of a layer based on alumina, the compound, an aluminate and an acid can be reacted, whereby alumina is precipitated. This precipitation can also be obtained by bringing together and by reacting the compound, an aluminium salt and a base.

Finally, the alumina can be formed by hydrolysis of an aluminium alkoxide.

As regards titanium oxide, it can be precipitated by introducing, into an aqueous/alcoholic suspension of the compound, a titanium salt, such as $TiCl_4$, $TiOCl_2$ or $TiOSO_4$, on the one hand, and a base, on the other hand. It is also possible to carry out the preparation, for example, by hydrolysis of an alkyl titanate or precipitation of a titanium sol.

Finally, in the case of a layer based on zirconium oxide, it is possible to carry out the preparation by cohydrolysis or coprecipitation of a suspension of the compound in the presence of an organometallic zirconium compound, for example a zirconium alkoxide, such as zirconium isopropoxide.

According to another alternative form, the compound of the invention is provided in the form of a powder, the particles of which comprise a zinc compound deposited at their surface. This zinc compound may have been obtained by reaction of a zinc precursor with ammonia and/or an ammonium salt. The form under which this zinc compound is provided in the product of the invention is not known with accuracy. However, in some cases, it may be thought that the zinc is present in the form of a zinc-ammonia complex of formula $Zn(NH_3)_x(A)_y$, in which A represents an anion, such as $OH^-$, $Cl^-$, the acetate anion or alternatively a mixture of anions, x being not greater than 4 and y being 2.

The compound containing zinc can be obtained by is bringing the starting compound into contact with a zinc precursor and ammonia and/or an ammonium salt. This operation of bringing into contact makes it possible to precipitate the zinc compound on the particles constituting the starting compound.

The zinc precursor can be a zinc oxide or a zinc hydroxide which is used in suspension. This precursor can also be a zinc salt, preferably a soluble salt. This can be an inorganic acid salt, such as a chloride, or alternatively an organic acid salt, such as an acetate.

Of course, the invention also relates to the combination of the alternative form which have just been described. Thus, it is possible to envisage a compound, the particles of which comprise an oxide layer with, in addition, zinc. In particular, the zinc can be included in the oxide layer or situated at the surface of the latter.

Various processes can be envisaged for the preparation of the compounds, the particles of which comprise zinc with an oxide layer.

In a first case, the starting compound, a zinc precursor, ammonia and/or an ammonium salt, and a precursor of the transparent oxide are brought into contact, then the zinc compound is deposited on the starting composition and the transparent oxide is precipitated on the starting compound.

In another case, in a first stage, the starting compound and a precursor of a transparent oxide are brought into contact and the transparent oxide is precipitated on the said starting compound, and then, in a second stage, the compound thus obtained is brought into contact with a zinc precursor and ammonia and/or an ammonium salt, and the zinc compound is deposited thereon.

According to another process, the compound, the zinc precursor, ammonia and/or the ammonium salt and, if appropriate, the precursor of the transparent oxide are brought into contact in the presence of an alcohol. The alcohol used is generally chosen from aliphatic alcohols, such as, for example, butanol or ethanol. The alcohol can, in particular, be introduced with the zinc precursor in the form of an alcoholic zinc solution.

According to yet another type of process, the compound, the zinc precursor, the ammonia and/or the ammonium salt and, if appropriate, the precursor of the transparent oxide are brought into contact in the presence of a dispersant. The aim of this dispersant is to prevent the agglomeration of the particles of the compound when they are suspended for the treatments described above. It also makes it possible to operate in more concentrated mixtures. It also promotes the formation of a homogeneous layer of transparent oxide on all the particles.

This dispersant can be chosen from the group of the dispersants which disperse by a steric effect and in particular non-ionic water-soluble or organosoluble polymers. Mention may be made, as dispersant, of cellulose and its derivatives, polyacrylamides, polyethylene oxides, polyethylene glycols, polyoxyethylenated polypropylene glycols, polyacrylates, polyoxyethylenated alkylphenols, polyoxyethylenated long-chain alcohols, poly(vinyl alcohol)s, alkanolamides, dispersants of the polyvinylpyrrolidone type or compounds based on xanthan gum.

In addition, it may be noted that it may be advantageous to treat with ultrasound the suspension obtained from the mixture of the reactants.

Finally, the product obtained at the end of the operations described above can be washed with water or with alcohol. It can also be dried in air or alternatively under vacuum.

It should be noted, for the additional alternative forms which have just been described, that is to say for the compounds in which the particles comprise a transparent oxide and/or a zinc compound at their surface, that the residual oxygen contents given above still apply, not to the overall compound (particles+transparent oxide and/or zinc compound) but to the starting compound, that is to say the particles without transparent oxide or zinc compound.

As a result of their properties, the compounds described above or as obtained by the processes which have just been studied can be used as luminophores, in particular in cathodoluminescence, that is to say in applications involving excitations of the electronic type.

They can thus be used in the manufacture of any device operating under this principle, such as FED or VFD flat screens, projection screens or television screens. The use of the compounds of the invention in this type of device takes place according to well known techniques, for example by deposition on screens by sedimentation, serigraphy or electrophoresis.

Finally, the invention applies to the abovementioned devices employing cathodoluminescence and comprising a compound according to the invention.

Examples will now be given.

In these examples, the particle size was measured according to the abovementioned technique. In addition, it is specified that the measurement was carried out on a dispersion of the product in a 0.05% by weight aqueous sodium hexametaphosphate solution which has been subjected beforehand to treatment with an ultrasonic probe (probe with a tip with a diameter of 13 mm, 20 kHz, 120 W) for 3 minutes. The chromaticity coordinates are given in the system as defined by the Commission Internationale d'Eclairage [International Lighting Commission] and listed in the Recueil des Normes Francaises [Compendium of French Standards] (AFNOR), calorimetric colour No. X08-12, (1983). The is oxygen content is determined by analysis with a Leco® device.

EXAMPLE 1

Synthesis of $(Sr_{0.95}Ce_{0.01}NA_{0.01})Ga_2S_4$

A mixture of cerium(III), gallium, strontium and sodium nitrates, in the proportions corresponding to those of the desired compound, is atomized on a Büchi® device, the inlet temperature being 210° C. whereas the outlet temperature is 110° C. The presence of sodium in the material allows the excess charge due to the cerium substituting for a fraction of the strontium to be compensated for.

10 g of the powder obtained are placed in a glassy carbon boat (bed thickness of 1 cm), which is then introduced into the leaktight sulphurization oven. The gaseous reaction mixture is composed of argon (50% by volume), of $CS_2$ (30%) and of $H_2S$ (20%). The flow rate of the gaseous mixture is 10 l/h.

The heat cycle is as follows: rise at 8° C./min from ambient temperature to 800° C., then a stationary phase of 30 minutes at 800° C. under an $H_2S/CS_2$ mixture and then a fall at 8° C./min under argon to a temperature of 60° C., from which the oven can be opened and the product collected.

The product is provided in the form of a phasically pure powder with a cubic crystallographic structure. The mean size of the particles is 4 μm. The dispersion index is 0.6. The oxygen content of the product is 1.1%.

The strontium thiogallate doped with cerium and sodium exhibits an intense luminescence in the blue when it is placed under UV excitation (254 nm) or under electronic excitation.

EXAMPLE 2

Synthesis of $(Sr_{0.95}Eu_{0.05})Ga_2S_4$

The same experimental procedure is followed for the synthesis of this compound. The highly reducing medium makes it possible to include europium with oxidation number two directly on the site of the strontium.

The product is provided in the form of a phasically pure powder with a cubic crystallographic structure, the X-ray spectrum of which is given in FIG. 1. The mean size of the particles is 3.3 µm. The dispersion index is 0.66. The oxygen content of the product is 1.1%.

The strontium thiogallate doped with europium luminesces in the green when it is placed under UV excitation (254 nm) or under electronic excitation.

EXAMPLE 3

This example relates to the application in low-voltage luminescence of compounds of Examples 1 and 2. The products were deposited by serigraphy on a transparent substrate with a loading level of 1 mg/cm$^2$. The efficacy of the thiogallate doped with cerium of Example 1 under low-voltage electronic excitation (V=400 V) was studied as a function of the current density. In the range of current densities studied (100–600 µA/mm$^2$), no variation in the response of the luminophore is observed, the latter being 1.0 lm/W. This is a high efficacy, taking into account the low loading level of the products on the substrate. The calorimetric co-ordinates are suitable for the production of a blue luminophore: x=0.124 and y=0.131.

Under the same excitation conditions, the luminous efficacy of the product of Example 2 doped with europium is 6 ml/W and the green emission is characterized by the following calorimetric co-ordinates: x=0.25 and y=0.71.

EXAMPLE 4

This example relates to the preparation of a compound according to the invention comprising a layer of zinc oxide and silica. The strontium thiogallate doped with 5% of europium of Example 2 is used as starting compound.

The treatment for the deposition of the layer of oxides is as follows.

The polyvinylpyrrolidone (PVP) is dissolved in the ethanol.

The strontium thiogallate is added to this solution. The suspension obtained is dispersed using ultrasound, and the ammonia solution and then the zinc precursor are subsequently added. The ethyl silicate is introduced continuously over two hours. After the end of introduction of the ethyl silicate, maturing is carried out for two hours. The particles thus obtained are washed with ethanol by filtration and then dried at 50° C. for twelve hours.

The reactants were used in the following proportions:

|  | g/kg |
|---|---|
| SrGa$_2$S$_4$ | 200 |
| Ethanol (95%) | 643 |
| Ammonia (32%) | 100 |
| Zinc oxide | 20 |
| Ethyl silicate | 32 |
| PVP K10 (Company Aldrich) Mw = 10000 | 5 |

A product encapsulated by a mixed silica/zinc layer is obtained.

EXAMPLE 5

This example relates to the preparation of a compound according to the invention comprising a layer of silica. The same starting compound is used as in Example 4 and the preparation is carried out in the same way but without using a zinc precursor.

The reactants are used in the following proportions:

|  | g/kg |
|---|---|
| SrGa$_2$S$_4$ | 200 |
| Ethanol (95%) | 663 |
| Ammonia (32%) | 100 |
| Ethyl silicate | 32 |
| Pvp K10 (Company Aldrich) Mw = 10000 | 5 |

A product encapsulated by a layer of silica is obtained.

What is claimed is:

1. A process for the preparation of a compound of formula AB$_2$S$_4$, wherein A represents one or more alkaline-earth metals and B represents at least one element selected from aluminum, gallium and indium, wherein said compound is in the form of a powder with a residual oxygen content of not more than 1.5%, said process comprising the steps of:

a) forming a solution or a suspension comprising salts of the elements A and B, and, optionally, of a doping element, b) drying the solution or the suspension by atomization, c) reacting the product obtained in the preceding step with carbon disulphide, hydrogen sulphide or with a gaseous mixture of hydrogen sulphide and or carbon disulphide, and d) recovering said compound.

2. A process according to claim 1, wherein the reaction with said gaseous mixture in step c) is carried out at a temperature of from 600 to 1000° C.

3. Process according to claim 2, wherein said salts are nitrates.

4. A process for the preparation of a compound of formula AB$_2$S$_4$, wherein A represents one or more alkaline-earth metals and B represents aluminum, gallium or indium, said compound being in the form of a powder composed of whole or unmilled particles with a mean size of not more than 10 µm, comprising the steps of:

a) forming a solution or a suspension comprising salts of the elements A and B, and, optionally, of a doping element, b) drying the solution or the suspension by atomization, c) reacting the product obtained in the preceding step with carbon disulphide, hydrogen sulphide or with a gaseous mixture of hydrogen sulphide and or carbon disulphide, and d) recovering said compound.

5. A process according to claim 4, wherein the reaction with said gaseous mixture in step c) is carried out at a temperature of from 600 to 1000° C.

6. A process according to claim 5, wherein said salts are nitrates.

* * * * *